United States Patent [19]
Anderson

[11] 4,063,611
[45] Dec. 20, 1977

[54] SURFACE EFFECT VEHICLE

[76] Inventor: Roland N. Anderson, 28090 Van Dyke, Warren, Mich. 48070

[21] Appl. No.: 687,955

[22] Filed: May 19, 1976

[51] Int. Cl.² .................... B60V 1/00; B60V 3/02
[52] U.S. Cl. ................................ 180/119; 180/21; 180/43 R; 280/698; 280/708
[58] Field of Search ............ 180/119, 117, 116, 21, 180/43 R; 280/96.3, 91, 87 R, 698, 708

[56] References Cited

U.S. PATENT DOCUMENTS

| | | | |
|---|---|---|---|
| 2,415,928 | 2/1947 | Barr | 280/96.3 X |
| 2,592,893 | 4/1952 | Hansen | 180/21 X |
| 2,641,480 | 6/1953 | Bancroft | 180/21 X |
| 3,235,283 | 2/1966 | DeVoghel | 280/91 |
| 3,398,809 | 8/1968 | Wood | 180/119 |
| 3,446,175 | 5/1969 | Boehler | 180/14 R |
| 3,586,118 | 6/1971 | Bertin | 180/119 |
| 3,648,796 | 3/1972 | Gamundi | 180/119 X |
| 3,656,572 | 4/1972 | Mercier | 180/72 X |
| 3,998,288 | 12/1976 | Aoki | 280/91 |

Primary Examiner—Joseph F. Peters, Jr.
Assistant Examiner—John P. Silverstrim
Attorney, Agent, or Firm—Peter A. Taucher; John E. McRae; Nathan Edelberg

[57] ABSTRACT

A surface effect vehicle wherein wheels or other ground contacting devices are utilized for propulsion and/or steering. The air or gas cushion forces are used only for hull suspension or floatation purposes.

1 Claim, 6 Drawing Figures

SURFACE EFFECT VEHICLE

BACKGROUND AND SUMMARY OF THE INVENTION

Conventional surface effect vehicles utilize air pressures or air forces for the three separate functions of steering, horizontal thrust (propulsion,), and hull floatation (suspension). The present invention proposes to obtain proper steering and horizontal thrust by means of powered wheels or other ground contact devices; the air cushion forces are utilized only for vertical thrust, i.e. hull floatation, or suspension above the supporting surface.

It is believed that the proposed arrangement is advantageous in achieving pivot turning, a more agile mode of operation, and quiet operation.

IN THE DRAWINGS

Figure 1:
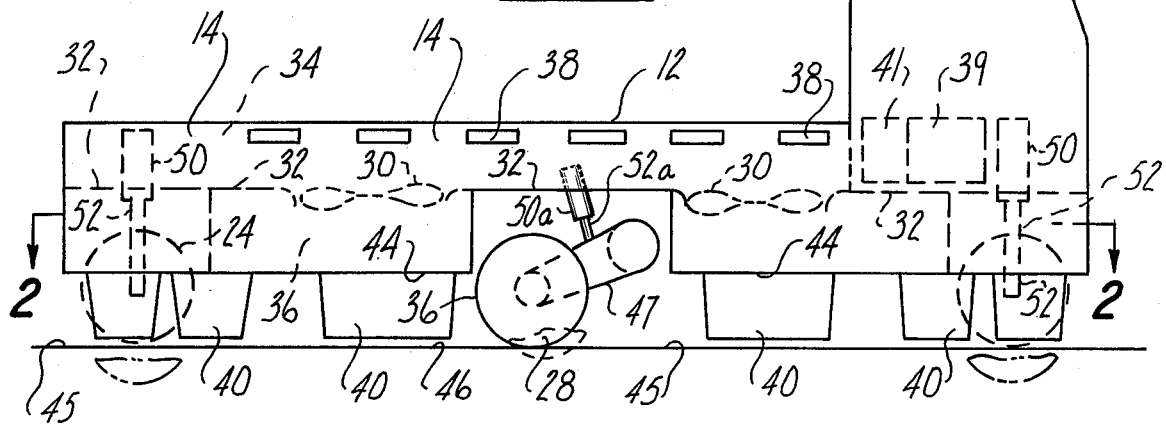
FIG. 1 is a side elevational view of a flat bed truck incorporating the invention.
Figure 2:
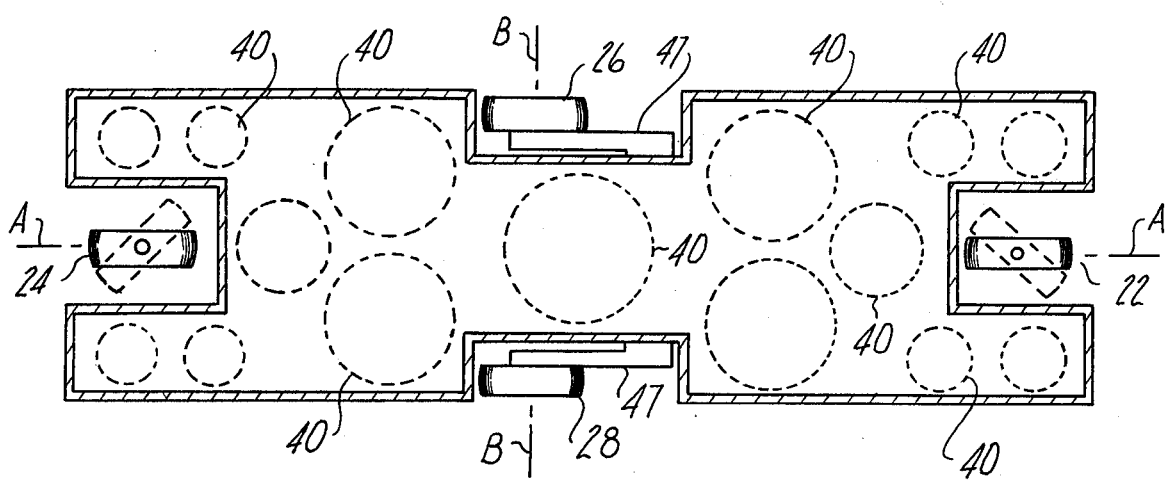
FIG. 2 is a sectional view taken essentially on line 2—2 in FIG. 1.

FIGS. 1 and 2 illustrate a vehicle that is similar in many respects to the Bertin Terraplane BC-7 vehicle shown on pages 14 and 15 of "Jane's Surface Skimmer Systems 1968-1969" published by B. P. C. Publishing Ltd., 49 Poland St., London, England. Both vehicles are provided with jupes or hollow cushions connected to an air pressure source for the vehicle lift function. Propulsion and steering functions are provided by ground contacting devices, such as wheels or endless tracks. Engine forces are delivered to some or all of the ground contacting devices for the propulsion function. Certain ones of the ground contacting devices are turnable in caster fashion to accomplish the steering function.

The herein proposed vehicle differs from the Terraplane BC-7 in regard to ground-contact device orientation. In the Terraplane the ground-contact wheels are conventionally arranged at the four corners of the vehicle. In the proposed vehicle two ground contacting devices are arranged at the left and right sides of the vehicle on or near its transverse centerline, i.e., amidships of the vehicle front and rear ends. Two other ground contacting devices are arranged at the front and rear ends of the vehicle on its longitudinal centerline. These last two ground contacting devices are swivel-mounted in caster fashion.

Steering of the proposed vehicle may be accomplished by swivel movement of the front and rear ground contacting devices to oblique and oppositely directed positions acutely angled to the longitudinal centerline of the vehicle. The front and rear wheels then track in a circular path around an imaginary centerpoint alongside the vehicle midway between its front and rear ends; the vehicle is enabled to turn in a very short radius. An even shorter turning radius may be achieved by driving the side wheels (ground contacting devices) in opposite directions. The vehicle then functions like a turntable.

Referring in greater detail to the drawings, FIGS. 1 and 2 show a flat bed truck having a cab 10, and a hull 14. The upper surface of the hull forms a bed 12 for cargo, such as a walk-in freight container, or MILVAN containers.

This vehicle could be a combat vehicle with the addition of suitable armament (not shown), and armor around the crew compartment and other vital areas.

Propulsion is provided by four wheel, 22, 24, 26 and 28. Wheels 22 and 24 are located on the longitudinal front-to-rear axis A of the vehicle. The two other ground contact wheels 26 and 28 are located on a transverse axis B extending approximately through the mid point of the vehicle.

Each ground contact wheel 22 or 24 is a caster wheel that can be swivelled about a vertical axis passing through the wheel rotational axis. The swivel movement enables the vehicle to be steered in substantially non-skid fashion. FIG. 2 illustrates two swivel-adjusted positions for each road wheel 22 or 24. The side wheels 26 and 28 are not swivel-mounted, but are retractable in the mode of aircraft landing gear. Preferably all wheels are live powered wheels.

The ground contact wheels may be formed of open mesh metal for lightness, self-cleaning capabilities and agressiveness in soft soil, water, snow or ice. For extremely difficult terrain each ground contact device may consist of a light track or belt trained around two or more road wheels carried on a walking beam. Since the ground contact devices do not bear suspension loads they can be very light, but would still be capable of supporting the weight of the vehicle fully loaded.

Figure 3:
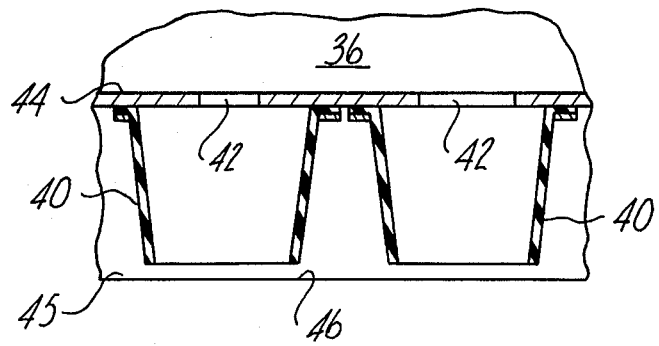
FIG. 3 illustrates a jupe detail used in the FIG. 1 vehicle.

Suspension force for the vehicle sprung mass may be provided by a number of conventional jupes 40 arranged to occupy the major portion of the vehicle plan area, as shown in FIG. 2. FIG. 3 illustrates a detailed construction that one of the jupes might take. Suspension gas at super-atmospheric pressure is supplied to each jupe through an opening 42 in hull bottom wall 44. The space immediately above wall 44 constitutes a manifold or plenum 36 communicating with an air pressure source such as fans 30; alternately each opening 42 may be connected to an individual pressurized gas supply duct (not shown).

Initial pressurization of the gas may be accomplished in conventional fashion through blowers or fans 30 suitably mounted in a wall 32 that subdivides the hull into an air inlet chamber 34 and pressurized plenum chamber 36. Air is initially admitted to chamber 34 through screened ports 38 in the hull side wall.

Various conventional type power plants can be used to power the fans. For example, each fan may be powered by an electric motor or hydraulic motor (not shown). An internal combustion engine 39 can be employed to drive a generator or hydraulic pump 41 to provide the electrical or hydraulic power.

Operation of each jupe 40 is conventional. The pressure within each jupe tends to lift the hull clear of the ground surface 45, enabling a daylight clearance 46 to be established, as desired. Horizontal propulsion force is provided by ground contact devices 22, 24, 26 and 28. The pressurized air is used only for lift and suspension of the hull, payload and cab, i.e., the sprung mass.

Figure 4:
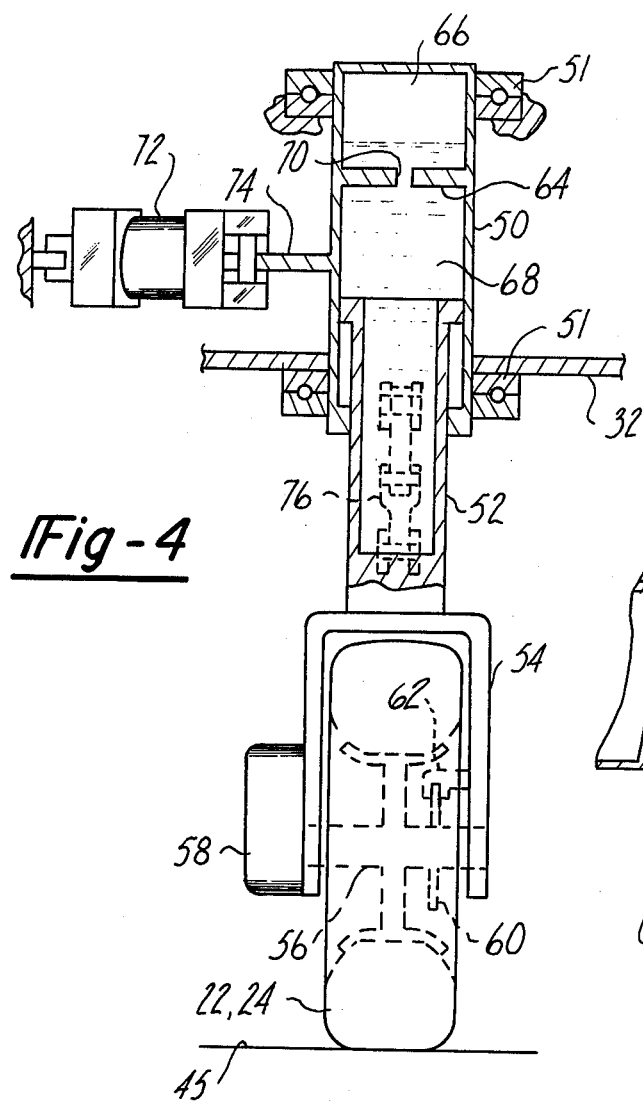
FIG. 4 illustrates a caster wheel assembly used in the FIG. 1 vehicle.

The ground contacting devices may have a resilient floating relationship with the hull to enable the devices to tractively follow the ground contour without disturbing or influencing the hull-ground spacing. At least the side ground contacting devices 26 and 28 must be powered. The front and rear wheels 22 and 24 are steerable as shown in FIG. 2. FIGS. 4 illustrates one mechanism that can be applied either to wheel 22 or 24 for steering and mounting purposes. A modified form of the FIG. 4 mechanism could be used for the non-steered side retractable ground contacting devices 26 and 28.

The mechanism shown in FIG. 4 is similar to a forward wheel strut of an aircraft; it comprises a cylinder 50 rotatably positioned in the hull by means of anti-friction bearings 51. The cylinder slidably receives a piston 52 which is connected at its lower end to a yoke 54. The yoke rotatably mounts an axle 56 carried by wheel 22 or 24. Rotational power input is applied to axle 56 by a conventional reversible motor 58 suitably carried on yoke 54. Motor 58 may be either electric or hydraulic, depending on the type of power plant used, i.e., the nature of element 41 (FIG. 1). Motor energizer lines or conduits are not shown.

Wheel braking is preferably hydraulic or pneumatic, using conventional state-of-the-art construction. The drawing shows a disk 60 carried by axle 56 and calipers 62 carried by yoke 54. Pressurized lines (not shown) supply the necessary fluid force to actuate the usual pistons within the calipers.

Cylinder 50 is subdivided by a partition 64 into an upper chamber 66 and lower chamber 68. As ground pressure forces wheel 22 or 24 upwardly the piston 52 pumps oil or similar liquid from chamber 68 through an orifice 70 into chamber 66. Trapped air in chamber 66 is pressurized to exert an opposing force, thereby producing a shock absorber action that maintains the ground contacting wheel 22 or 24 in firm tractive engagement with ground surface 45 without disturbing the attitude of the hull.

The wheel-mounting assembly shown in FIG. 4 can be very light gage and small diameter because the wheel unit is not required to handle hull suspension forces. Principal forces are those forces that arise by reason of the movement of hull wall 32 toward or away from ground surface 45. Trapped air within chamber 66 provides sufficient force to keep the ground-contacting wheel in tractive engagement with surface 45 without producing any substantial upward bias on hull wall 32. If it were desired that wheel 22 or 24 handle a fractional share of the suspension load it would be necessary to pump air into chamber 66 from a remote source (not shown).

Steering force may be applied to the caster wheel assembly by a conventional double-acting fluid cylinder 72 suitably linked to an arm 74 carried by cylinder 50. A toggle linkage 76 interconnects cylinder 50 and piston 52 to transmit steering force from the cylinder to the piston; i.e., to prevent relative rotation between the cylinder and piston. During normal up-down sliding motion of the piston the toggle linkage 76 folds and unfolds without exerting any appreciable effect on the piston motion.

A modified form of the FIG. 4 mechanism can be used to mount the ground contacting wheels 26 and 28 (FIGS. 1 and 2). The modifications are those necessary to eliminate the steering function. Such modifications would involve elimination of steering cylinder 72 and bearings 51.

Figure 5:
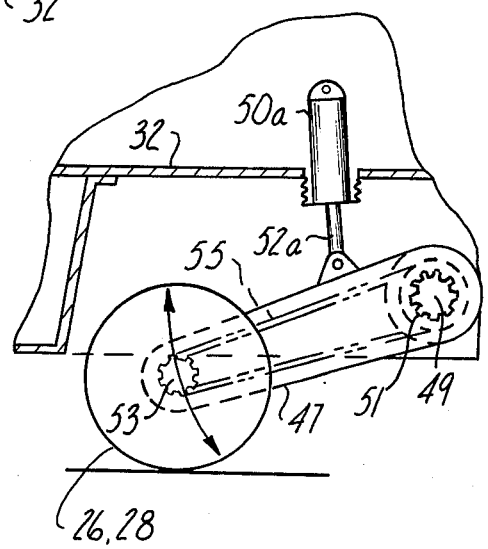
FIG. 5 illustrates a non-steerable wheel assembly used in the FIG. 1 vehicle.
Figure 6:
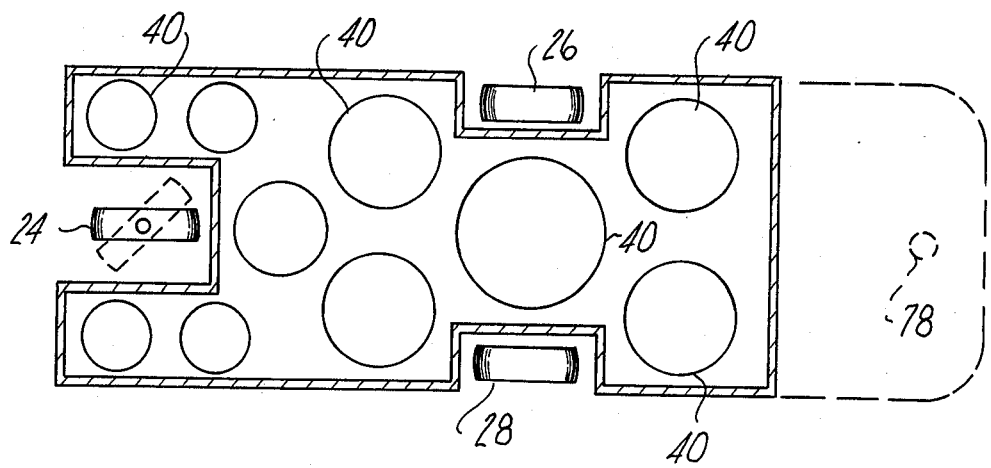
FIG. 6 is a view similar to FIG. 2, taken through a trailer incorporating the invention.

FIG. 5 illustrates an alternate wheel-mount mechanism that comprises a hollow trailing arm 47 swingably connected to the hull for movement around transverse axis 49. Drive forces are transmitted to the wheel by a chain drive extending within the trailing arm. As shown, the drive comprises a first sprocket 51 carried by the trailing arm pivot shaft, a second sprocket 53 affixed to the wheel axle, and a chain 55 trained around the sprockets. Power means, not shown, is connected to sprocket 51 to provide motive force for the respective wheel 26 or 28. The power means can take various forms, for example a hydraulic motor, electric motor, auxiliary engine, or power take-off from main engine 39. Each wheel 26 or 28 may be given a shock absorption mount force by means of a fluid cylinder 50a and cooperating piston 52a. Internal construction of the piston-cylinder assembly may be similar to that of the piston-cylinder assembly 52, 50 shown in FIG. 4.

The vehicle shown in FIGS. 1 and 2 is primarily a land vehicle. However it has potential soft soil or amphibious capability for use in fluidized soils or water, i.e., swamps, lakes, rivers, surf, etc. When used on water, snow, or soft soil the ground contacting devices 22, 24, 26 and 28, with built-in paddles such as on the Bertin BC-7, will be at least partially immersed in the media, as shown in dashed lines in FIG. 1. Under such conditions the trapped air in each chamber 66 (FIG. 4) will exert sufficient downward force on the assembly to immerse the wheel in the media.

Rotation of the wheel in the media will produce horizontal thrust (propulsion) if the wheel is suitably formed with vanes or ribs projecting from the side or peripheral surface of the wheel. Wheels formed of open mesh or flat wire construction are believed to provide the necessary projections while taking advantage of the lightness feature made possible by the fact that the wheels are not required to, but are capable of, handling suspension forces. If the ground contacting devices are constructed as tracked units the tracks per se can be very light open mesh metal or rubberized fabric equipped with rubber pads in a cats paw arrangement. The immersed portion of the track would provide propulsion force.

The invention is concerned primarily with non-articulated vehicles, as shown in FIGS. 1 and 2. Certain features of the invention may however be incorporated in articulated vehicles, such as tractor-trailer assemblies. FIG. 5 illustrates the trailer portion of such an assembly. The front end portion of the trailer (shown in dashed lines) is equipped with a kingpin 78 for connection with the fifth wheel of the tractor, not shown. The ground-contacting devices 24, 26 and 28 provide propulsion and steering inputs to the tractor and trailer that are additive to the inputs by the non-illustrated tractor. This combination is aimed at increased traction-propulsion of the assembly over terrain that would be impassible with conventional tractor-trailer assemblies. Several powered trailers may be in this combination.

FEATURES OF THE INVENTION

The principal feature of the invention is improved steerability of the vehicle due to the ground-contacting device orientation and swivel (caster) mounting for selected ones of the ground-contacting assemblies.

The steerability of the vehicle shown in FIG. 1 and 2 would be very good due to the locations of the steered wheels 22 and 24, plus the reversability of devices 26 and 28. The vehicle should be able to turn 360° about its midpoint when devices 26 and 28 are powered in opposite directions. More gradual turns can be negotiated by merely adjusting the angularities of wheels 22 and 24, as shown in dotted lines in FIG. 2. Improved steerability is especially important in relatively long vehicles exceeding thirty feet, and in surface effect vehicles that lack lateral stability.

It is believed that the illustrated vehicle should have fairly good traction and handling characteristics, due to the fact that the ground contacting devices are powered and downwardly biased (by means of the piston-strut assembly 50, 52). The vehicle is primarily a land vehicle; however it does have use on water as an amphibious device. No vehicle modifications are required to go from land operation to water operation, or vice versa.

In its preferred form the vehicle uses a multiplicity of jupes 40 for the suspension function. Such jupes are preferred over the conventional peripheral skirt employed in water-borne vehicles. The jupes are advantageous in land vehicles because each jupe can deflect over minor obstacles (logs, rocks, etc.) with minimum air loss or change in vehicle attitude. However, a peripheral skirt (not shown) may be added for increased floatation and rough sea stability.

When the vehicle is traversing ditches or gulleys there may be some possibility that the vehicle will have an end area or center area thereof hung up on a ridge or inclined ground area; the hang-up action could conceivably occur in the event that ground depressions prevent one or more of the traction devices 22, 24, 26 or 28 from reaching the ground surface. It is believed that this undesirable result would be avoided because of the orientation of the ground contacting devices shown in FIG. 2. There are three ground contact planes along the vehicle length, instead of two such planes as in conventional vehicles. Thus, wheel 22 constitutes a forward contact plane, wheel 24 constitutes a rearward contact plane, and wheels 26 and 28 constitute an intermediate contact plane. Hopefully the extensible shock-absorption strut assemblies 50, 52 will permit traction to be maintained at one or more of these three planes whatever the location of the potential hang-up point. Preferably each of the four wheels is powered to provide propulsion action when some of the wheels have lessened tractive engagement with the ground surface.

I wish it to be understood that I do not desire to be limited to the exact details of construction shown and described for obvious modifications will occur to those skilled in the art.

I claim:

1. A surface effect vehicle comprising a hull (14) having a front end and a rear end, said hull having a longitudinal front-to-rear centerline and a transverse side-to-side centerline;

air cushion means (40) carried by the hull on its undersurface (44) for exerting a downward force on the terrain and an upward lift force on the hull;

a first ground-contact wheel (22) located at the front end of the hull on its longitudinal centerline; a second ground-contact wheel (24) located at the rear end of the hull on its longitudinal centerline; third and fourth ground-contact wheels located at respective side areas of the hull approximately on its transverse centerline;

combined steering-suspension means for each of the first and second wheels; each steering-suspension means comprising a piston-cylinder assembly (52, 50) oriented vertically between the hull and associated wheel for rotational adjustment around a central axis passing approximately through the wheel axis in the wheel center plane, and power mechanism (72) for bodily turning the piston-cylinder assembly around its central axis for steering action; each piston-cylinder assembly being resiliently pressurized whereby the piston-cylinder assembly maintains the associated wheel in firm tractive engagement with the terrain without disturbing the attitude of the hull;

each piston-cylinder assembly defining an upper chamber (66) and a lower chamber (68) interconnected through a flow-restrictor orifice (70), pressurized gas within each upper chamber, and hydraulic liquid occupying each lower chamber and orifice;

combined drive-suspension means for each of the third and fourth wheels; each drive-suspension means comprising an external trailing arm (47) swingably attached to the hull for arcuate vertical movement around a transverse pivot axis (49) located a short distance forwardly of the aforementioned hull transverse centerline, a wheel axle carried at the rear end of the trailing arm, drive means (55) within the trailing arm for transmitting a drive force to the wheel axle, and a piston-cylinder means (52a, 50a) trained between the hull and each trailing arm; each of the last-mentioned piston-cylinder means being resiliently pressurized with a gas-liquid charge, whereby the third and fourth wheels are maintained in firm tractive engagement with the terrain without disturbing the hull attitude.

* * * * *

UNITED STATES PATENT OFFICE
CERTIFICATE OF CORRECTION

Patent No. 4,063,611   Dated December 20, 1977

Inventor(s) Roland N. Anderson

It is certified that error appears in the above-identified patent and that said Letters Patent are hereby corrected as shown below:

Column 1, after line 5, should read:

---The invention described herein may be manufactured, used, and licensed by or for the Government for governmental purposes without payment to me of any royalty thereon.

Column 3, line 4, "FIGS 4" should read -- FIG 4 --.

Signed and Sealed this

Twenty-third Day of May 1978

[SEAL]

Attest:

RUTH C. MASON  
Attesting Officer

LUTRELLE F. PARKER  
Acting Commissioner of Patents and Trademarks